M. ECHARD.
VALVE GEAR WITH ROTARY VALVES.
APPLICATION FILED JUNE 28, 1920.

1,427,726.

Patented Aug. 29, 1922.
2 SHEETS—SHEET 1.

Inventor
Marcel Echard
by H. B. Willson & Co.
Attorneys

M. ECHARD.
VALVE GEAR WITH ROTARY VALVES.
APPLICATION FILED JUNE 28, 1920.

1,427,726.

Patented Aug. 29, 1922.

Inventor
Marcel Echard
by H. B. Willson & Co
Attorneys

UNITED STATES PATENT OFFICE.

MARCEL ECHARD, OF NEUILLY-SUR-SEINE, FRANCE.

VALVE GEAR WITH ROTARY VALVES.

1,427,726.  Specification of Letters Patent.  Patented Aug. 29, 1922.

Application filed June 28, 1920. Serial No. 392,437.

*To all whom it may concern:*

Be it known that I, MARCEL ECHARD, a citizen of the Republic of France, residing at Neuilly-sur-Seine, Seine Department, No. 9 Rue Montrosier, in the Republic of France, have invented certain new and useful Improvements in Valve Gears with Rotary Valves for which I have filed an application in France December 8, 1915, and of which the following is a specification.

This invention relates to motors operating by internal combustion by superheated steam, or to motors of the combination type which in addition to explosion or combustion are adapted to make use of the adjunction of water in any suitable state such as in the mixed or atomized state, as steam, or as supplied by jet.

The object of the invention is to provide means which are applicable to flat or conical rotary valve gear, in order to obviate all undue friction of the valve member upon its seat while undergoing the pressure arising from explosion or expansion. This result is obtained by equilibrating this pressure by means of a compensating piston upon which the pressure is caused to act in the contrary sense; this compensating piston can be actuated either directly by the fluid of the motor or by means of a liquid-pressure of the direct or the differential type.

The accompanying drawing represents by way of example an embodiment of the invention as applied to valve gear with conical rotary valve.

In these figures, $a$ is the motor cylinder, $b$ the piston, $c$ the water circulation, $d$ the valve member of the conical rotary valve gear which is constructed together with the compensating piston $e$, the latter being either secured to this member $d$ or constructed in the same piece with the latter; the arms $f$ connect the valve member $d$ and the piston $e$ to the operating shaft $g$ for producing the rotation of the valve.

Figure 1:
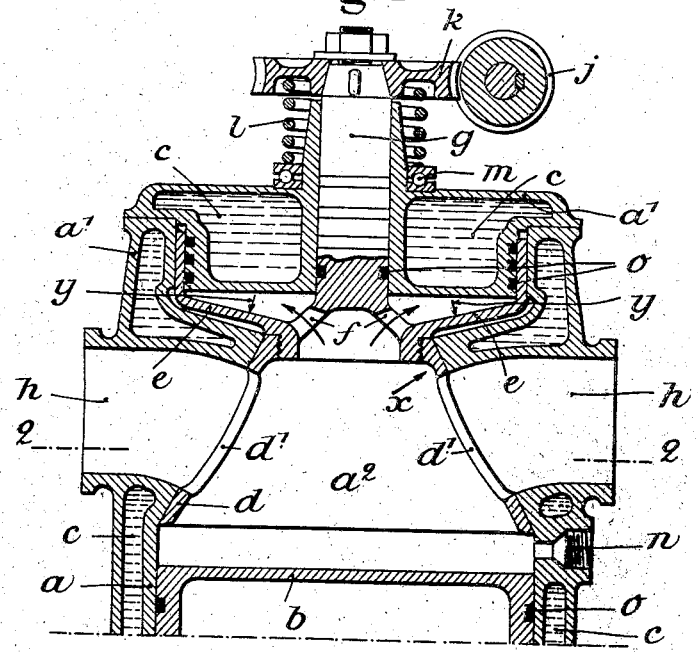
Fig. 1 is an axial vertical section through the upper part of a motor cylinder, i. e., on the line 1—1 of Fig. 2, the compensating piston being actuated directly by the motor fluid.
Figure 2:
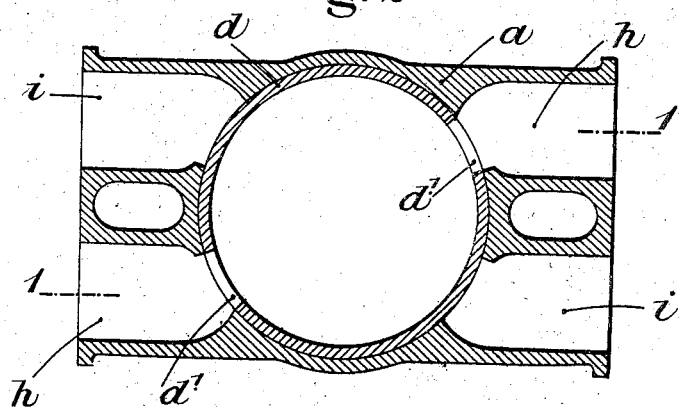
Fig. 2 is a horizontal section on the line 2—2 of Fig. 1.

During the rotation of the valve, this latter brings its two diametrically opposite ports $d^1$ $d^1$ successively in coincidence with the two inlet orifices $h$ (Fig. 2) and with the two exhaust orifices $i$.

This rotary motion of the valve is effected by means of the worm $j$ engaging the worm gear $k$ which is keyed to the driving shaft $g$ of the valve member $e$. A return spring $l$ is adapted to rotate upon the thrust bearing $m$ disposed upon the cover $a^1$ of the cylinder, and it acts upon the lower side of the gear $k$, whereby the valve $d$ is held in contact with the walls of the cylinder constituting the valve seat; $n$ is the screw-threaded opening in which is mounted the ignition device; $o$ represent the packing rings either for the piston $b$, the shaft $g$, the cover $a^1$, or the compensating piston.

When the ignition takes place, the pressure prevailing in the compression chamber or cylinder head $a^2$ tends to force the valve $d$ upon its seat, according to the arrow $x$, but this effort is also exerted according to the arrow $y$, or in the contrary sense, upon the piston $e$, the operative surface of the latter being calculated in such manner as to equilibrate this pressure at each instant and according to the variations, of the motor diagram, thus reducing the friction to a minimum.

Figure 3:
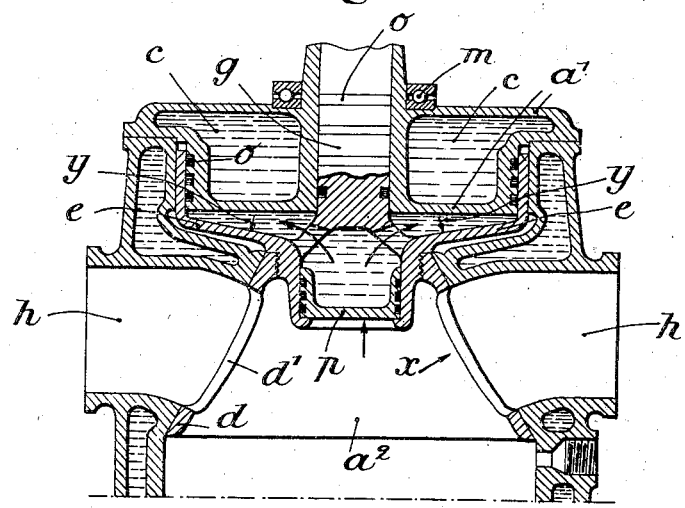
Figs. 3 and 4 are sections, corresponding to that of Fig. 1, of alternative forms in which the compensating piston is actuated by means of a liquid-pressure piston respectively by direct action or by differential action.

Fig. 3 represents the same valve gear, but in this case a liquid such as oil or the like is disposed between the compression chamber $a^2$ of the cylinder and the working surface of the compensating piston $e$, for the purpose of obviating the back and forward movements of the gas, these being incompatible with high speeds. A small piston $p$, or a flexible diaphragm, is employed to transmit the pressure of the motor fluid prevailing in the chamber $a^2$ to the liquid contained in the chamber $q$ between the piston $p$, the shaft $g$, the cover $a^1$ and the compensating piston $e$; the pressure which is exerted in a uniform manner by the liquid upon the compensating piston $e$ according to the arrow $y$ will equilibrate the pressure exerted by the valve member $d$ upon its seat according to the arrow $x$, whereby the friction of this valve member upon its seat is obviated.

This arrangement has the advantage of limiting the access of gas to the distributing member below the piston $p$, thus obviating losses of heat which would occur by reason of the relatively great area of the walls of the chamber $q$. Moreover, it acts to prevent the continual back and forward movement of the gases between the chambers $a^2$ and $q$, this movement having an injurious effect upon the efficiency of the motor, especially at high speeds.

Figure 4:
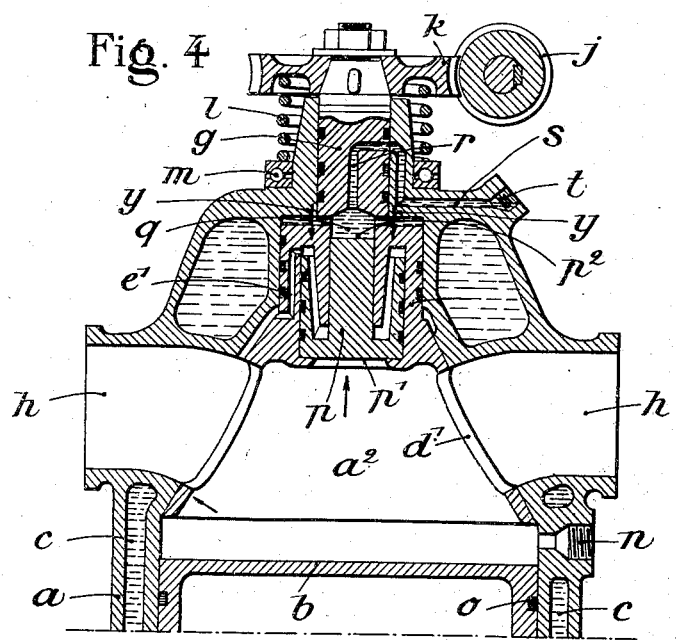

Fig. 4 represents the same valve gear as in Figure 3, but in order to reduce the size of the compensating piston, the auxiliary piston is now made of the differential type. The pressure which it exerts upon the liquid in the chamber $q$ is proportional to the ratio $\frac{p^1}{p^2}$ between the upper and lower surfaces of the auxiliary $p$, and this affords a means for reducing the cross-section of the piston in the same ratio.

A passage $e^1$ provided within the wall of the compensating piston $e$ allows the air or gas to escape during the relative displacements of the pistons $e$ and $p$.

The supply of the chamber $q$ with liquid such as oil or the like in order to compensate for the leakage of oil which occurs in spite of the packing rings $o$, can be effected for instance through a duct $r$ provided within the shaft $g$, this duct cooperating with a duct $s$ provided in the wall of the cylinder surrounding the shaft $g$, in such manner as to come opposite this latter duct preferably when the cylinder $a$ is at its suction period and therefore when no pressure is exerted upon the compensating piston $e$; this duct $s$ may communicate with a reservoir containing oil or other liquid and connected with the neck $t$. Instead of producing this liquid feed automatically by the suction of the motor, it can be produced by means of a pump which is connected for the purpose to the neck $t$. This feed method can also be applied to the alternative form shown in Figure 3.

The present invention has been herein described as applicable to valve gear with conical rotary valve, but it is of course equally applicable to flat rotary valves.

The principle of the invention remains the same in the case of a plurality of valves disposed in any suitable manner upon the same cylinder and actuated either with continuous or discontinuous circular motion or with alternate motion.

Claims:

1. In a piston operated engine, the combination of a power cylinder having a noncylindrical circular seat, a revoluble valve fitted against the said seat, a compensating piston rigidly connected with the said valve, the said piston having formed therein a small cylindrical recess, an auxiliary cylinder having the said compensating piston slidable therein, an end portion provided upon the said cylinder, an auxiliary piston slidable in the said recess of the compensating piston, and a liquid occupying the space between the end of the said auxiliary cylinder, the said auxiliary piston and the compensating piston.

2. In a piston-operated engine, the combination of a power cylinder having a noncylindrical circular seat, a revoluble valve fitted against the said seat, a compensating piston rigidly connected with the said valve, an auxiliary cylinder having the said compensating piston slidable therein, an end portion provided upon the said cylinder, the said compensating piston having formed therein a small differential recess, a small differential piston disposed within the said recess, the narrow portion of the small differential piston being directed towards the said cylinder end, and a liquid occupying the space between the said cylinder end, the said compensating piston and the said differential piston.

In testimony, that I claim the foregoing as my invention I have signed my name in presence of a subscribing witness.

MARCEL ECHARD.

Witness:
MAURICE ROUS.